July 12, 1932. F. P. NOFFSINGER 1,867,522
PICKING TABLE
Filed Feb. 5, 1931
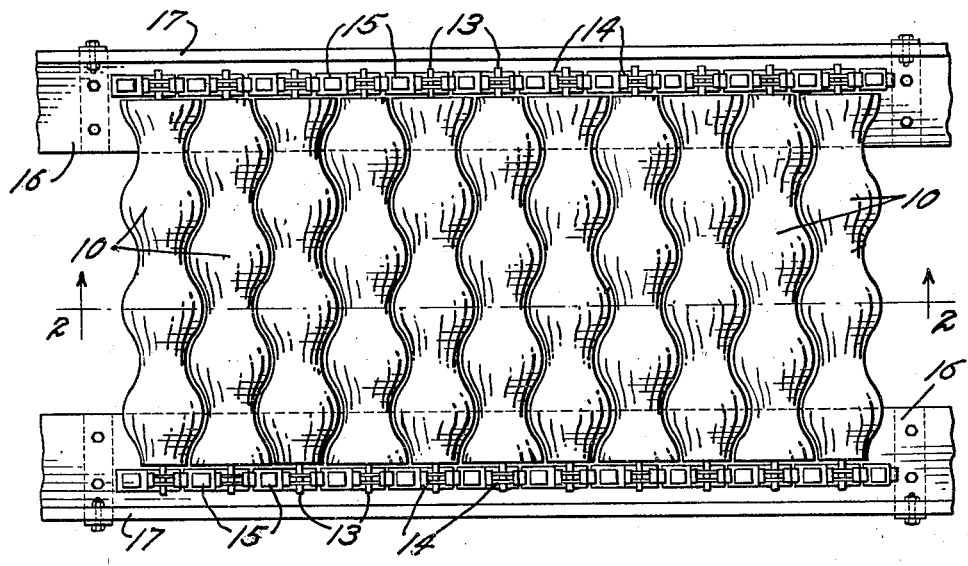
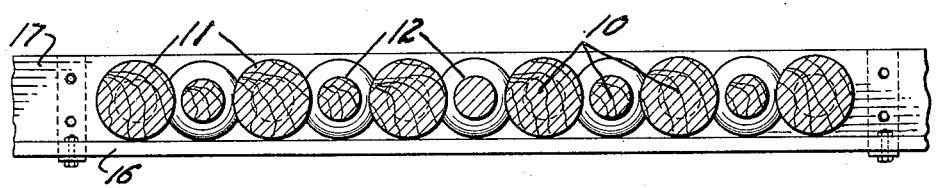
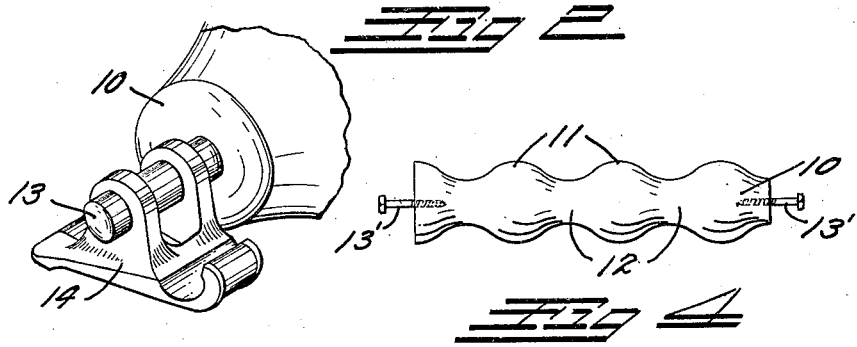
Inventor
FRED P. NOFFSINGER
By
Attorney Patented July 12, 1932

1,867,522

UNITED STATES PATENT OFFICE

FRED P. NOFFSINGER, OF GREELEY, COLORADO

PICKING TABLE

Application filed February 5, 1931. Serial No. 513,652.

This invention relates to a picking table of the type adapted to carry articles before pickers who pick out the blemished and unmarketable articles as they are carried past. The principal object of this invention is to so construct the table that the articles thereon will be constantly turned in all directions so that all sides thereof will be exposed to the observation of the pickers so that a more efficient selection can be made.

The invention is more particularly designed as a potato picking table but it would be equally applicable for picking any variety of fruit, vegetables, etc., or for any other article where it was desired to roll them about so as to expose all sides for observation.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a plan view of a portion of the improved picking table.

Fig. 2 is a longitudinal section therethrough taken on the line 2—2, Fig. 1.

Fig. 3 is a detailed view illustrating one of the chain attachment links for supporting the roller shafts of the table.

Fig. 4 is a detail view illustrating a typical table roller.

The improved picking table is formed by a travelling series of parallel rollers 10, a typical roller being illustrated in detail in Fig. 4. The rollers 10 are all similar in contour, the adjacent rollers being reversed in position. Each roller comprises a series of spherical balls or bulbulous portions 11, joined together by concave, cylindrical necks 12. The roller contour is such that the balls 11 of one roller will fit into the concave necks 12 of the adjacent rollers, so as to leave uniform sinuous spaces between adjacent rollers which allow dirt and trash to sift through.

A short stud shaft 13 projects on the axis of each roller at its extremities. The shafts 13 rotate in attachment links 14 all of which are joined together by means of chain links 15 to form continuous travelling chains at each side of the series of rollers. The chains travel over suitable sprocket wheels (not shown) as is common in conveying practice.

A rolling motion is imparted to the rollers as they travel by means of track boards 16 which support the rollers and upon which they roll. The boards 16 extend under the rollers sufficiently far to contact with the periphery of the first ball 10 at the extremity of each roller. Side boards 16 are provided to protect the operators at the side of the table and to prevent the chains from pulling away from the roller shaft 13.

The articles placed upon the table will rest in the depressions formed by the necks 11 and will be constantly rolled over and over by the rolling action of the rollers as they are conveyed past the pickers. If the rollers were cylindrical the articles would be constantly rolled in one direction but by providing the balls 11 and necks 12 on the rollers a variety of peripheral speeds is provided on each roller which acts to turn and twist the articles in all directions as they travel so as to expose all sides to the observation of the pickers.

While a specific form of the improvement has been described and illustrated herein, it is desired to be understood that the same may be varied, within the scope of the appended claims, without departing from the spirit of the invention.

Having thus described the invention what is claimed and desired secured by Letters Patent is:

1. A picking table comprising: a travelling series of parallel closely spaced rollers; each roller comprising a series of spherical portions; and concave cylindrical necks joining said spherical portions, said rollers being arranged in staggered relation so that the spherical portions of one roller will project into the concavities of the necks of the adjacent rollers.

2. A picking table comprising: a travelling series of parallel closely spaced rollers; each roller comprising a series of spherical portions; concave cylindrical necks joining said spherical portions, said rollers being arranged in staggered relation so that the spherical portions of one roller will project into the concavities of the necks of the adjacent rollers; and track boards extending under said series of rollers along their extremities sufficiently far to contact with the closest periphery of a spherical portion on each roller so that all of said rollers will be supported thereby and so that a rotation will be imparted to all of said rollers as the series travels.

3. A roller for travelling, rolling picking tables comprising: a series of balls; and concave necks joining said balls together in a complete roller, one extremity of said roller terminating at the center of one of said balls, the other extremity terminating at the middle of one of said necks so that when adjacent rollers are reversed they will fit into each other.

In testimony whereof I affix my signature.

FRED P. NOFFSINGER.